United States Patent
Lane et al.

(10) Patent No.: US 7,484,884 B2
(45) Date of Patent: Feb. 3, 2009

(54) PROBE FOR THERMOMETRY APPARATUS HAVING LIGHT PASSAGE FEATURES TO ENABLE SAFE INSERTION

(75) Inventors: John A. Lane, Weedsport, NY (US);
David E. Quinn, Auburn, NY (US);
Whitney A. Bouma, San Diego, CA (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 118 days.

(21) Appl. No.: 11/528,743

(22) Filed: Sep. 28, 2006

(65) Prior Publication Data
US 2008/0080593 A1  Apr. 3, 2008

(51) Int. Cl.
*G01J 5/04* (2006.01)

(52) U.S. Cl. .................. 374/121; 374/141; 374/209; 600/474

(58) Field of Classification Search .......... 374/163, 374/169, 170–171, 179, 208, 120–121, E7.015, 374/E13.002, E13.003, E1.009; 600/549, 600/379, 474, 185, 249, 199–200, 160, 162, 600/177–180; 73/292–293
See application file for complete search history.

(56) References Cited

U.S. PATENT DOCUMENTS

| | | | |
|---|---|---|---|
| 2,761,057 A * | 8/1956 | Modell | 374/191 |
| 3,490,287 A | 1/1970 | Coben | |
| 3,733,130 A | 5/1973 | Young | |
| 4,159,766 A | 7/1979 | Kluge | |
| 4,166,389 A | 9/1979 | Mortren | |
| 4,197,944 A | 4/1980 | Catlin | |
| 4,536,851 A | 8/1985 | Germanton et al. | |
| 4,549,819 A | 10/1985 | Muramoto et al. | |
| 4,588,306 A | 5/1986 | Burger et al. | |
| 5,336,206 A | 8/1994 | Shichman | |
| 5,357,954 A | 10/1994 | Shigezawa | |

(Continued)

FOREIGN PATENT DOCUMENTS

JP  60239622  11/1985

(Continued)

OTHER PUBLICATIONS

International Search Report/Written Opinion (ISR/WO), May 19, 2008, 12 pages.

*Primary Examiner*—Edward Lefkowitz
*Assistant Examiner*—Bret Adams
(74) *Attorney, Agent, or Firm*—Hiscock & Barclay, LLP

(57) ABSTRACT

A probe for use in sensing body temperature includes a longitudinally elongated tubular member having a wall defining a hollow interior, a distal end having a closed tip, and a temperature sensing element mounted in the tip producing a signal indicative of the temperature of the tip. A lighted indicia is provided by one or more light passages disposed in the wall of the tubular member and a light emitting device is disposed in operative association therewith for illuminating the light transmissive indicia from interiorly of the tubular member. The lighted indicia is disposed at a selected distance longitudinally inwardly of the end of the tip portion of the probe commensurate with the desired depth of rectal insertion during use of the probe in rectal application. The region in front of the probe may be illuminated by light passing through a light passage in the probe tip.

44 Claims, 4 Drawing Sheets

U.S. PATENT DOCUMENTS

| | | | |
|---|---|---|---|
| 5,601,980 A | 2/1997 | Gordon et al. | |
| 5,632,555 A | 5/1997 | Gregory et al. | |
| 5,832,621 A | 11/1998 | Pavano | |
| 5,834,641 A | 11/1998 | Sternal | |
| 6,000,846 A | 12/1999 | Gregory et al. | |
| 6,036,361 A | 3/2000 | Gregory et al. | |
| 6,042,266 A * | 3/2000 | Cheslock et al. | 374/158 |
| 6,367,973 B2 * | 4/2002 | Yamaka | 374/158 |
| 6,443,000 B1 | 9/2002 | Pugh et al. | |
| 6,591,049 B2 * | 7/2003 | Williams et al. | 385/123 |
| 6,626,918 B1 | 9/2003 | Ginn et al. | |
| 6,634,789 B2 | 10/2003 | Babkes | |
| 6,702,784 B1 | 3/2004 | Sheckler et al. | |
| 6,827,488 B2 | 12/2004 | Knieriem et al. | |
| 6,850,789 B2 * | 2/2005 | Schweitzer et al. | 600/340 |
| 6,886,979 B2 * | 5/2005 | Conforti | 374/208 |
| 6,957,911 B2 | 10/2005 | Wong et al. | |
| 6,971,790 B2 | 12/2005 | Quinn et al. | |
| 6,976,783 B2 | 12/2005 | Chen | |
| 2003/0088187 A1 | 5/2003 | Saadat et al. | |
| 2003/0092975 A1 | 5/2003 | Casscells et al. | |
| 2004/0019293 A1 * | 1/2004 | Schweitzer et al. | 600/549 |
| 2004/0233970 A1 | 11/2004 | Conforti | |
| 2005/0010084 A1 * | 1/2005 | Tsai | 600/200 |
| 2005/0015018 A1 | 1/2005 | Dolphin et al. | |
| 2006/0000103 A1 | 1/2006 | Nicosia et al. | |
| 2006/0062274 A1 | 3/2006 | Pompei | |
| 2006/0106365 A1 | 5/2006 | Lane et al. | |
| 2006/0149121 A1 | 7/2006 | Hughett et al. | |
| 2006/0291535 A1 * | 12/2006 | Craig et al. | 374/208 |
| 2008/0045802 A1 * | 2/2008 | Brandstaetter et al. | 600/199 |

FOREIGN PATENT DOCUMENTS

| | | |
|---|---|---|
| JP | 2000005137 | 1/2000 |

* cited by examiner

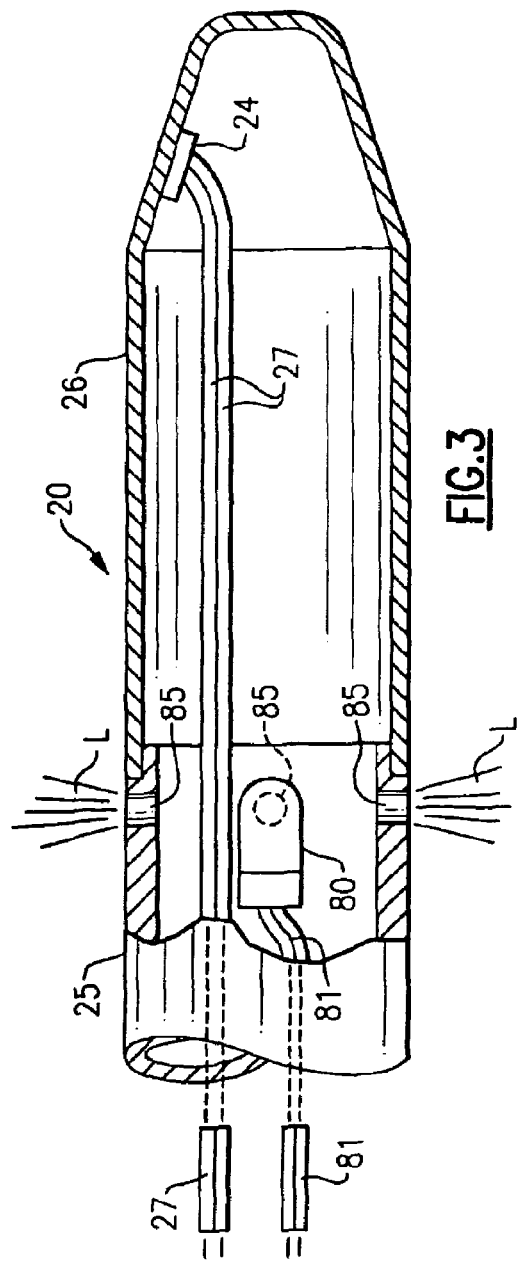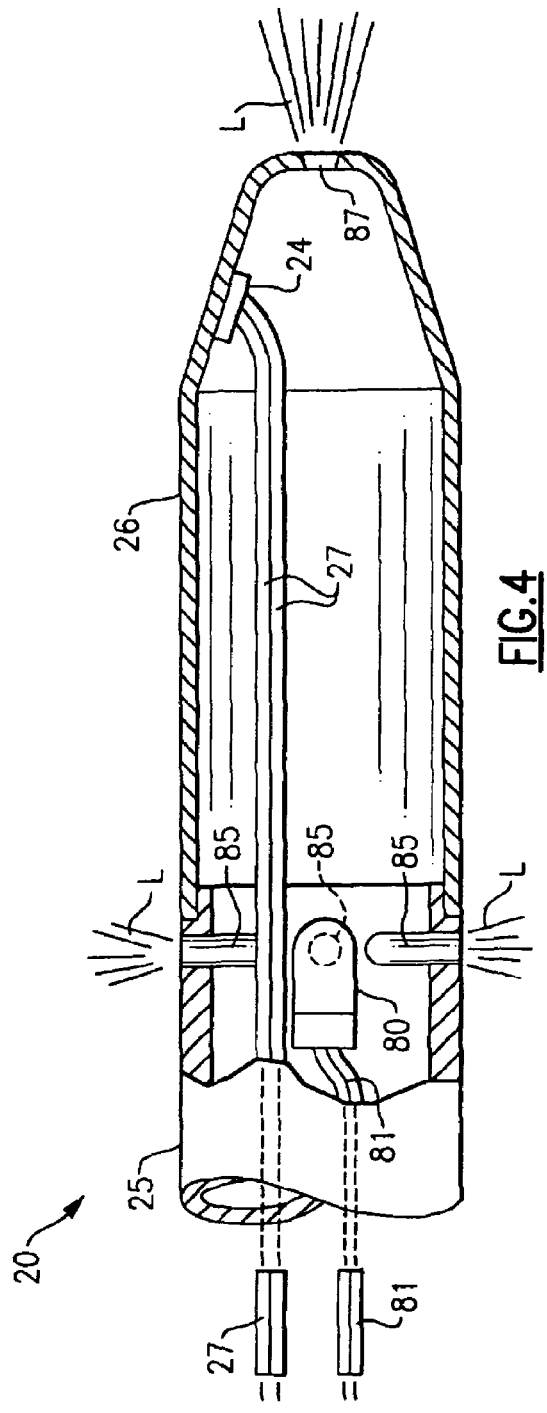

PROBE FOR THERMOMETRY APPARATUS HAVING LIGHT PASSAGE FEATURES TO ENABLE SAFE INSERTION

CROSS REFERENCE TO RELATED APPLICATIONS

This application makes reference to copending U.S. patent application Ser. No. 10/989,631, filed Nov. 16, 2004, and entitled "Probe Cover For Thermometry Apparatus", which application is assigned to the common assignee to which this application is subject to assignment, and the entire content of which is incorporated herein by reference.

FIELD OF THE INVENTION

This invention relates generally to measuring a patient's body temperature and, more particularly, to electronic thermometry apparatus for measuring a patient's body temperature via a temperature sensing probe.

BACKGROUND OF THE INVENTION

Electronic thermometry apparatus for measuring a patient's body temperature orally, rectally or axillarily via a temperature probe have been in common use in doctor's offices, clinics, hospitals and other health care facilities for many years. Typically, such medical thermometers include an axially elongated, cylindrical temperature probe having a temperature sensing element, commonly a thermocouple or thermistor, disposed within a distal tip of the probe. The temperature probe is tethered to a base housing by a flexible cord and the temperature sensing element is connected by signal conductive wires passing through the flexible cord to a processor carried in the base housing. The processor, conventionally a microprocessor, includes software for processing signals received from the temperature sensing element of the temperature probe to accurately estimate the patient's temperature. The patient's temperature is then displayed on a display, such as a LED display, carried on the base housing. Electronic thermometers of this type are disclosed in U.S. Pat. Nos. 5,632,555; 6,000,846; 6,036,361; 6,827,488 and 6,971,790, the entire contents of which are incorporated herein by reference, and are commercially available from Welch Allyn, Inc, the common assignee of the aforementioned patents and the assignee to which this application is subject to assignment.

For hygienic reasons, it is customary practice to place a sterile disposable probe cover over the temperature probe prior to each use. The purpose of the disposable probe cover, which is discarded after a single use, is to prevent cross-contamination between patients. If the temperature probe were used without a new sterile disposable probe cover for each use, the temperature probe would have to be sterilized between each use, therefore limiting the application and practicality of the portable electronic thermometer, particularly in multi-patient health care facilities. Conventionally, such temperature probe covers are elongated, hollow plastic sheaths molded to conform to the shape of the temperature probe.

When a patient's temperature is to be measured rectally, care must be taken to ensure that the probe is not inserted too deeply. If penetration is excessive, the temperature sensing elements in the probe tip will likely not be properly positioned in the rectum, which will result in an inaccurate temperature measurement. Further, if the probe is inserted too deeply, particularly with respect to infants, the probe might damage rectal tissue. Typically, the temperature probe would be inserted only about 1.5 centimeters (about ⅝ inches) into the rectum for adults, less for infants and children.

To facilitate use of the temperature probe in rectal applications, some probe covers are provided with an over-insertion indicator. For example, U.S. Pat. Nos. 4,159,766 and 6,957,911 each disclose a temperature probe having an exterior over-insertion indicator. U.S. Pat. No. 4,159,766 discloses a cover for a temperature sensing probe having a shoulder on the exterior of the probe cover set back axially from the distal tip of the probe a preselected distance commensurate with the desired penetration depth for rectal applications. U.S. Pat. No. 6,957,911 discloses an infant thermometer whose probe includes a flexible annular flange disposed on the exterior of the probe axially inwardly from the probe tip to indicate the correct depth of insertion for rectal application on infants.

In practice, a patient's temperature is often taken, whether orally, rectally or axillarily, in a dimly lighted room or at night in a multi-patient room or ward where it is desirable to maintain a low level of lighting to avoid disturbing other patients. Inadequate lighting may also be a problem when taking a patient's temperature rectally even in a relatively well lighted room. In U.S. Pat. No. 6,886,979, a temperature measuring device is disclosed wherein a light in the handle of the device illuminates the area in front of the probe and a region of the temperature probe immediately axially inward of the probe tip which is made of a luminescent material or ink to facilitate use in the nighttime or low level lighted environments.

SUMMARY OF THE INVENTION

It is an object of an aspect of the invention to provide a temperature sensing probe with rumination.

In is an object of an aspect of the invention to provide a temperature sensing probe having illuminated indicia of a depth of insertion limit for rectal temperature measurement.

In an aspect of the invention, a probe for use in sensing a body temperature of a vertebrate includes a longitudinally elongated tubular member having a wall defining a hollow interior, a proximal end connected to a handle, and a distal end having a tip portion with a closed end. A temperature sensing element is mounted in the tip portion of the tubular member for producing a signal indicative of the temperature of the tip portion. A light emitting device is provided in operative association with the tubular member for illuminating the hollow interior of the tubular member and a light passage is provided through the wall of the tubular member for providing a path for light from the light emitting device to pass exteriorly of the tubular member. In an embodiment, the light passage is positioned at a selected distance from the end of the tip portion of the tubular member. The light passage may be positioned so as to provide an indicia of an insertion depth limit on the distal end of the tubular member, which is particularly advantageous when the probe is used to measure a vertebrate's temperature rectally. In an embodiment, an additional light passage may be disposed at the end of the portion of the tubular member through which light from the light emitting device illuminates an area exterior of and forward of the tip portion of the tubular member.

In an aspect of the invention, a temperature sensing probe is provided for use in connection with an electronic thermometry apparatus having a temperature calculating unit for estimating a body temperature of a patient and a display for presenting the temperature of the patient. The temperature sensing probe includes a longitudinally elongated tubular member having a wall defining a hollow interior, a proximal end connected to a handle, and a distal end having a tip portion with a closed end. A temperature sensing element is mounted in the tip portion of the tubular member for producing a signal indicative of the temperature of the tip portion. A light emitting device is provided in operative association with the tubular member for illuminating the hollow interior of the tubular member and a light passage is provided through the wall of the tubular member for providing a path for light from the light emitting device to pass exteriorly of the tubular member. In an embodiment, the light passage is positioned at a selected distance from the end of the tip portion of the tubular member. The light passage may be positioned so as to provide an indicia of an insertion depth limit on the distal end of the tubular member, which is particularly advantageous when the probe is used to measure a vertebrate's temperature rectally. In an embodiment, an additional light passage may be disposed at the end of the portion of the tubular member through which light from the light emitting device illuminates an area exterior of and forward of the tip portion of the tubular member.

In a further aspect of the invention, a rectal probe for use in sensing a body temperature of a vertebrate via insertion into the vertebrate's rectum includes a longitudinally elongated tubular member having a wall defining a hollow interior, a proximal end connected to a handle, and a distal end having a tip portion with a closed end. A temperature sensing element is mounted in the tip portion of the tubular member for producing a signal indicative of the temperature of the tip portion. A lighted indicia is provided in the wall of the tubular member and a light emitting device is disposed in operative association therewith for illuminating the lighted indicia from interiorly of the tubular member. The lighted indicia is disposed at a selected distance longitudinally inwardly of the end of the tip portion of the probe commensurate with the desired depth of rectal insertion during use of the rectal probe. In an embodiment, an additional light passage may be disposed at the end of the portion of the tubular member through which light from light emitting device illuminates an area exterior of and forward of the tip portion of the probe.

In an aspect of the invention, a probe for use in sensing a body temperature of a vertebrate includes a longitudinally elongated member having a proximal end connected to a handle, a closed distal end forming a tip portion of the probe, and an exterior surface. A temperature sensing element is mounted in the tip portion of the tubular member for producing a signal indicative of the temperature of the tip portion of the probe. A light emitting device is mounted in the handle of the probe and a disposable probe cover overlays the exterior surface of the longitudinally elongated member of the probe. The probe cover has a light transmissive wall operative as a light pipe for conducting light emitted from the light emitting device along the longitudinally elongated member from its proximal end to the distal tip portion of said probe. In an embodiment, the probe cover may have a transparent distal tip end and a translucent shaft. In an embodiment, the probe cover may have a translucent tip and a transparent shaft. The probe cover may have a textured tip or a tip of a color different from the remainder of the cover. The light emitting device may emit a colored light effective to highlight any moisture on the exterior surface of the probe cover.

In another aspect of the invention, a thermometry apparatus is provided for use in determining a body temperature of a patient. The thermometry apparatus includes a temperature sensing probe having a hollow interior and a temperature sensing element mounted within the tip portion of the probe for producing a signal indicative of the temperature of the tip portion of the probe, a processor for receiving that signal and estimating a the temperature of the patient based on that signal, a display for displaying the temperature of the patient, a light emitting device for illuminating the hollow interior of the probe, and a light passage through the wall of the probe for providing a path for light from the light emitting device to pass exteriorly of the probe. In an embodiment of the thermometry apparatus, the light passage is positioned at a selected distance from the end of the tip portion of the probe. The light passage may be positioned so as to provide an indicium of an insertion depth limit on the distal end of the tubular member, which is particularly advantageous when the probe is used to measure a vertebrate's temperature rectally. In an embodiment, an additional light passage may be disposed at the end of the portion of the tubular member through which light from light emitting device illuminates an area exterior of and forward of the tip portion of the tubular member.

In an embodiment the light passage comprises at least one opening through the wall of said tubular member. In an embodiment, the light passage may be a plurality of holes through the wall of the tubular member which are disposed at circumferentially spaced intervals about the wall of the tubular member. In an embodiment, the light passages may be a plurality of circumferentially extending slots through the wall of the tubular member disposed so as to form a band about the wall of the tubular member. In further embodiments, the openings may be sealed with a translucent material or a transparent material. In an embodiment, the tip portion of the tubular member is formed of a light transmissive material whereby the tip portion of the tubular member is illuminated.

In an aspect of the invention, a thermometry apparatus for use in determining a body temperature of a patient includes a temperature sensing probe including a longitudinally elongated tubular member, a temperature sensing element mounted within a tip portion of the probe for producing a signal indicative of the temperature of the tip portion of the probe, a light emitting device operatively associated with the probe for illuminating the tip portion of the probe, a processor for receiving the signal indicative of the temperature of the tip portion of the probe and calculating a the temperature of the patient based on the received temperature signal, and a display operatively associated with the processor for displaying the temperature of the patient. The processor includes a comparator for comparing the calculated patient temperature to a preset threshold temperature limit and a control unit for providing an alert perceptible to a user if the calculated patient temperature exceeds the preset threshold temperature limit. To provide the alert that the measured patient temperature exceeds the threshold temperature limit, the control unit may flash the light emitting devices, or change the color of the light emitted by the light emitting devices, or flash the temperature displayed on the display, or present a warning icon on the display or light said warning lamp provided on a handle of the probe.

In a further aspect of the invention, a disposable probe cover is provided for use in connection with an elongated probe of a thermometry apparatus. The disposable probe cover has an axially elongated sleeve member having an open proximal end and a closed-ended distal tip identifying a desired depth of insertion of the elongated probe. The sleeve member is light transmissive axially to form a light-pipe and the distal tip is delineated to provide an indicia of the desired depth of insertion of the elongated probe. For example, the distal tip of the sleeve member may be light transparent, light translucent, textured, of a color distinctive from remainder of the sleeve member, or have a band of luminescent material at a selected distance inwardly from the closed end of the distal tip commensurate with the desired depth of insertion of the elongated probe.

BRIEF DESCRIPTION OF THE DRAWINGS

For a further understanding of the invention, reference will be made to the following detailed description of the invention which is to be read in connection with the accompanying drawing, where:

FIG. 3 is a side elevation view, partly sectioned, of an exemplary embodiment of a temperature sensing probe in accordance with an aspect of the invention;

FIG. 4 is a side elevation view, partly sectioned, of another exemplary embodiment of a temperature sensing probe in accordance with an aspect of the invention;

DETAILED DESCRIPTION OF THE INVENTION

Figure 1:
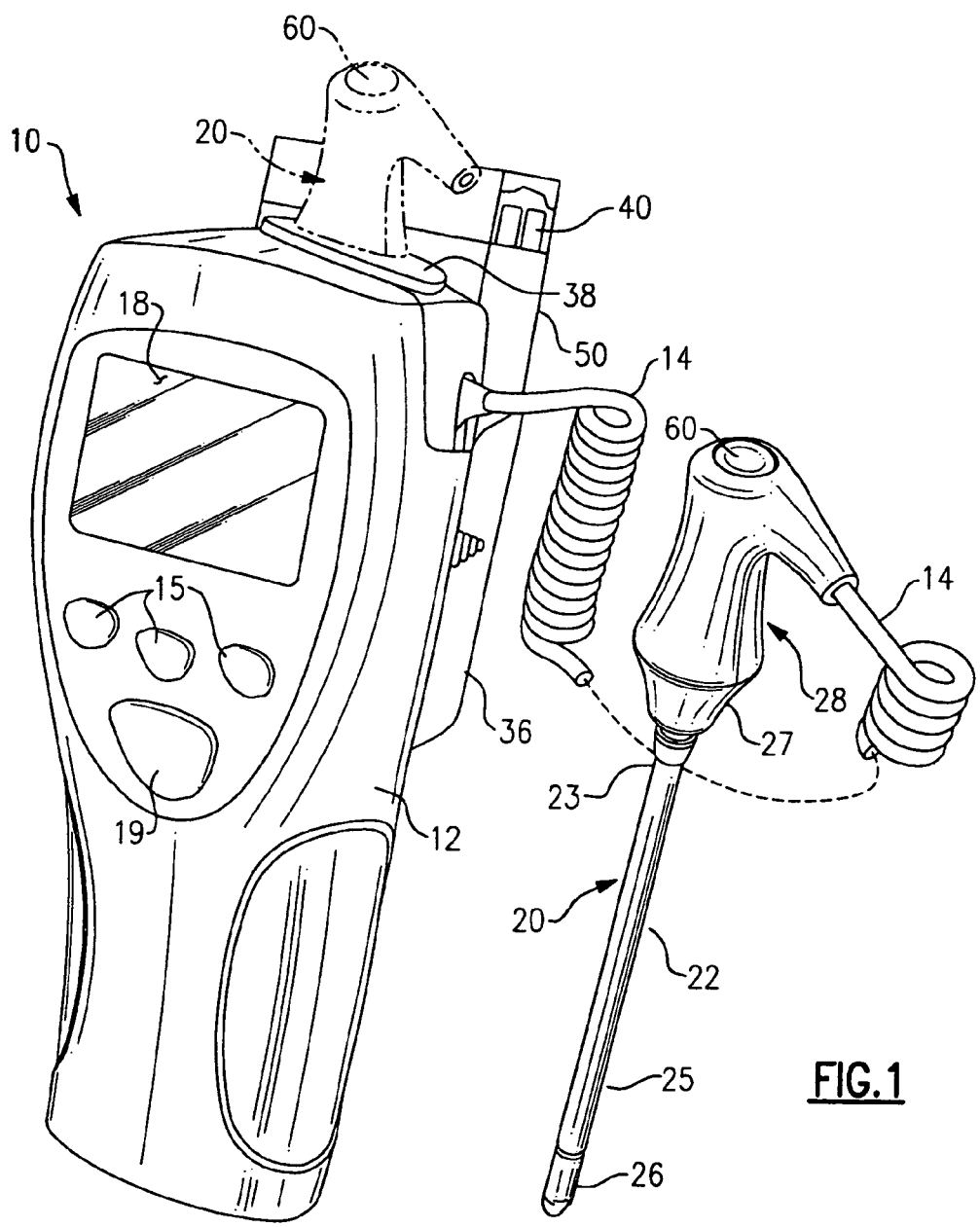
FIG. 1 is a perspective view of a portable medical thermometry apparatus equipped with a temperature sensing probe.
Figure 2:
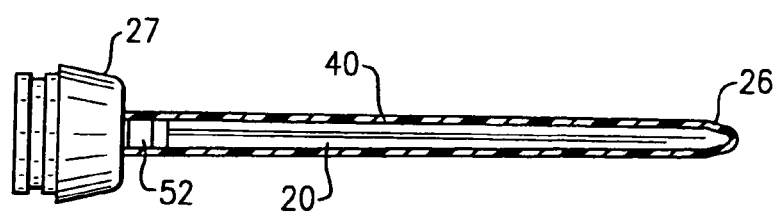
FIG. 2 is a side elevation view, partly sectioned, illustrating a probe cover overlaying the shaft of the temperature sensing probe.

Referring now to FIGS. 1-2, there is depicted an exemplary embodiment of an electronic thermometry apparatus 10, commonly referred to as a portable electronic thermometer, of the type conventionally used in healthcare facilities for measuring a patient's temperature either orally, rectally or axillarily. The thermometry apparatus 10 includes a compact base housing 12 and a temperature sensing probe 20. The temperature probe 20 includes an axially elongated member 22 having a temperature sensing element 24, commonly a thermocouple or thermistor, disposed within a tip 26 at the distal end 25 of the elongated member 22 and having a handle 28 at the proximal end 23 of the elongated member 22. The temperature probe 20 is releasably tethered to the base housing 12 by a flexible cord 14 extending from the handle 28 of the temperature probe 20 to the base housing 12. The temperature sensing element 24 is connected by signal conductive wires 27 passing through the flexible cord 14 to a processor, not shown in FIG. 1, carried in the base housing 12. A probe cover receptacle 36 may be provided on the base housing 12, for example on the rear of the base housing 12, in which a package 50 of sterile disposable probe covers 40 are housed. Additionally, a probe chamber 38 may be provided in association with the base housing 12, for example on the rear of the base housing laterally adjacent the probe cover receptacle 36 or incorporated into the base housing 12, such as for example the removable probe well disclosed in the aforementioned U.S. Pat. No. 6,827,488 and depicted in FIG. 1, into which the temperature probe 20 may be inserted for convenient storage when not in use.

Figure 8:
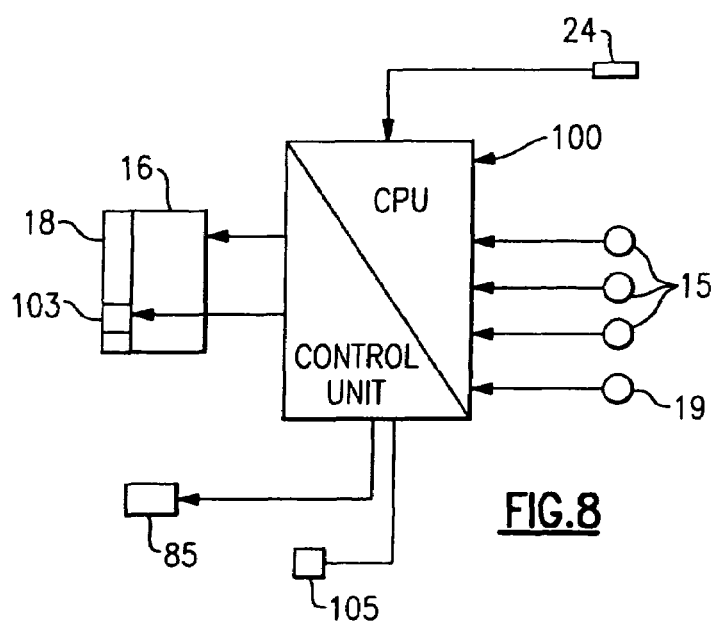
FIG. 8 is a schematic illustration of an exemplary temperature signal processing method for use in connection with the thermometry apparatus of the invention.

Referring now to FIG. 8, the processor 100, conventionally a microprocessor, includes a central processing unit, CPU, and a control unit operatively associated therewith. The central processing unit includes software for processing signals received from the temperature sensing element 24 of the temperature probe 20 to accurately estimate the patient's temperature. A user interface operatively associated with the processor 100 may be provided on the front of the base housing 12 that includes a display 16, such as a LED (light emitting diode) screen 18, on which the patient's temperature is displayed and one or more buttons 15 by means of which a nurse or other healthcare clinician may select the mode of temperature measurement, e.g. orally, rectally or axillarily, select between a temperature display in degrees Centigrade or degrees Fahrenheit, to be used in measuring the patient's temperature, or set a timer alert. The display may also include a recall button 19 which may be depressed to display a prior temperature reading on the display screen 18.

Figure 5:
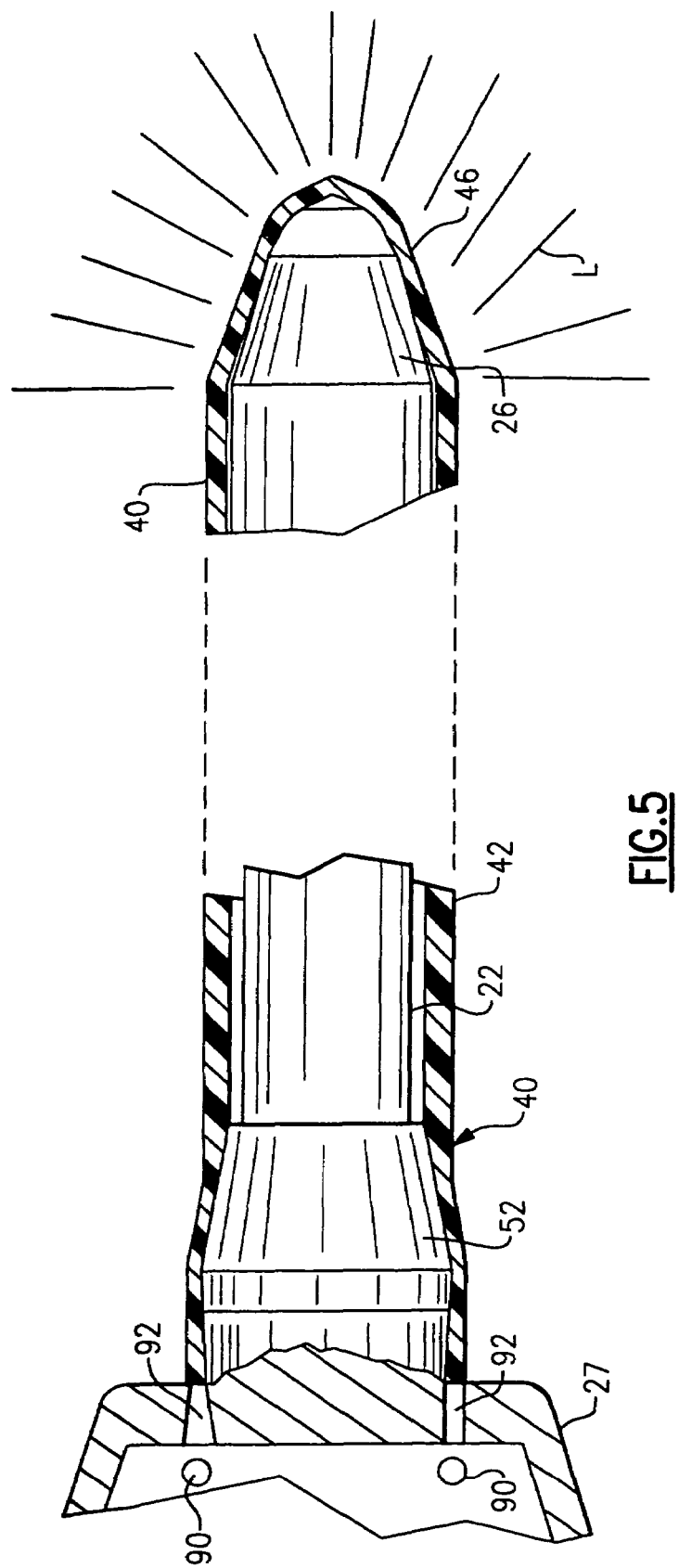
FIG. 5 is a side elevation view, partly sectioned, of another exemplary embodiment of a temperature sensing probe in accordance with another aspect of the invention.

Referring now to FIGS. 3-5 in particular, the elongated member 22 is a tubular, generally cylindrical member having a relatively thin wall and made from stainless steel or other thermally conductive material having relatively high strength. The tip 26 of the temperature probe 20 is also made from a stainless steel or other similar thermally conductive material and is secured to the distal end 25 of the elongated member 22, typically either by means of bonding with an epoxy or other adhesive or by laser welding. The temperature sensing element 24 is installed within the tip 26 and the signal conductive wires 27 are connected thereto and fed through the hollow interior of the shaft of the tubular elongated member 22 prior to securing the tip 26 to the distal end 25 of the tubular member 22. Conventionally, the elongated member 22 and tip 26 are sized appropriately for insertion into a body site of the patient, for example into a patient's rectum. However, the temperature probe 20 may also be used to take a patient's temperature orally by placing the tip 26 of the probe 20 in a sublingual pocket beneath the tongue at the back of a patient's mouth or axillary by placing the tip 26 of the probe 20 in the pocket of the patient's arm pit.

The temperature probe 20 may also include a resistive or other heating element (not shown), advantageously disposed in the tip 26 of the probe, for pre-heating the probe tip to a desired temperature, such as for example about 93° F., in order to acclimate the probe tip prior to taking a temperature measurement, thereby reducing the overall time required to obtain an accurate temperature measurement. For a more detailed discussion of such a heating element and the other aforementioned features, as well as other features that may be included in conventional practice in a medical thermometry apparatus, reference should be made to the aforementioned U.S. Pat. Nos. 5,632,555; 6,000,846; 6,036,361; 6,827,488 and 6,971,790.

In accord with conventional practice, to take a patient's temperature, the user removes the temperature probe 20 from the probe chamber 38. Advantageously, the thermometry apparatus 10 may be configured such that removal of the probe 20 from the probe chamber 38 automatically activates the thermometry apparatus 10, for example as described in greater detail in the aforementioned U.S. Pat. No. 6,827,488. If the thermometry apparatus 10 is not configured for automatic activation, the user will push an appropriate button (not shown) on the base housing 12 to activate the thermometry apparatus.

To take a patient's temperature rectally, after verifying that the probe 20 is indeed a rectal probe and that the display 18 indicates that the thermometry apparatus 10 is in a rectal temperature measurement mode, and if not manually selecting the rectal temperature measurement mode, the user inserts the temperature probe 20 into a disposable probe cover 40 stored within the probe cover receptacle 36. When the user next withdraws the temperature probe 20 from the probe cover receptacle 36, a disposable probe cover 40 will overlay the tip 26 and the elongated member 22 of the probe as depicted in FIG. 2. With the probe cover 40 in place, the user may apply a lubricant to the probe cover and thereafter insert the distal end of the covered probe 20 into the patient's rectum for a short distance, typically about 1.5 centimeters (about ⅝ inches) for an adult, less for infants or children. The user then holds the probe in position until a temperature reading appears on the display 18, typically about 10 to 15 seconds, and thereafter removes the temperature probe.

To take a patient's temperature orally after verifying that the temperature probe 20 is indeed an oral probe and that the display 18 indicates that the thermometry apparatus 10 is in an oral temperature measurement mode, and if not manually selecting the oral temperature measurement mode, the user inserts the temperature probe 20 into a disposable probe cover 40 stored within the probe cover receptacle 36. When the user next withdraws the temperature probe 20 from the probe cover receptacle 36, a disposable probe cover 40 will overlay the tip 26 and the elongated member 22 of the probe 20 as depicted in FIG. 2. With the probe cover 40 in place, the user inserts the covered distal end of the probe 20 into the patient's mouth such that the tip 26 is appropriately positioned into one of the sublingual pockets beneath the tongue at the rear of the mouth. The user then holds the probe 20 in position until a temperature reading appears on the display 18, typically about 4 seconds, and thereafter removes the temperature probe.

To take a patient's temperature axillarily in accord with conventional practice, after verifying that the temperature probe 20 is indeed an axillary probe and that the thermometry apparatus 10 is in an axillary temperature measurement mode, and if not manually selecting the axillary temperature measurement mode, the user inserts the temperature probe 20 into a disposable probe cover 40 stored within the probe cover receptacle 36. When the user next withdraws the temperature probe 20 from the probe cover receptacle 36, a disposable probe cover 40 will overlay the tip 26 and the elongated member 22 of the probe. With the probe cover 40 in place, the user inserts the covered probe 20 upwardly between the patient's arm and torso such that the tip 26 is appropriately positioned as high as possible to contact the patient's arm pit. The user then holds the probe 20 in position until a temperature reading appears on the display 18, typically about 15 seconds, and thereafter removes the temperature probe.

Probe covers 40 are used in each of the oral, rectal or axillary temperature measurement modes as a necessary hygienic protection measure to guard against cross-contamination of the probe 20 from patient to patient. Conventionally, as depicted in FIG. 2, a probe cover 40 is an elongated, hollow sleeve-like member having an open proximal end 42 and a closed distal tip 44, sized to be disposed onto the exterior of the elongated member 22 and tip 26 of the probe 20. In application to the probe of the invention, the probe cover 40 must be light transmissive. An exemplary probe cover 40 may be made from a low density polyethylene, polypropylene or other suitable translucent or transparent plastic material, by fusion molding, injection molding or other suitable process. When the probe 20 is inserted into a probe cover 40, the open end 42 of the probe cover 40 is releasably secured at the forward end 27 of the handle 28, such as for example by an annular retaining barb 52 extending from the forward end of the handle over which the open end 42 of the probe cover 40 is stretched. After completion of the temperature measurement process, the disposable probe cover 40 is ejected from the temperature probe 20 when the user depresses the button 60 at the proximal end of the probe handle 28. Depression of the button 60 activates an ejection member (not shown) which releases the probe cover from the retaining barb 52 and thrusts the probe cover forward along the elongated member 22 and off the distal end of the probe 20. A more detailed discussion of an exemplary probe cover ejection process is presented in the aforementioned co-pending U.S. patent application Ser. No. 10/989,631.

Referring now to FIGS. 3 and 4, in particular, in one aspect of the invention, a lamp 80 is disposed within the hollow interior of the elongated tubular member 22 in the distal end 25 thereof. The lamp 80, which may be a light emitting diode (LED) or other small, relatively high intensity light, is electrically connected by wires 81 which extend through the hollow interior of the tubular member 22 and the flexible cord 14 to a power source (not shown) disposed in the base housing 12 of the thermometry apparatus 10. Additionally, at least one light passage 85 is provided in the wall of the elongated tubular member 22 through which light, L, emitted by the lamp 80 will pass to illuminate the area exterior of the probe 20 in the vicinity of the passage. Advantageously, a plurality of light passages 85 may be provided at spaced intervals about the circumference of the distal end 25 of the tubular member 22 so as to provide a "band" of light emitting from the distal end of the probe 20.

In an aspect of the invention, the at least one light passage or the plurality of light passages 85 are provided in the wall of the tubular member 22 at a location being a selected distance inwardly from the distal end of the tip 26 commensurate with the desired depth of insertion of the probe into the rectum of a patient during a rectal temperature measurement procedure. So positioned, the beam or beams of light emitted from the at least one light passage or plurality of light passages 85 provide a visible indicia indicating the depth of insertion of the probe 22 the rectum of a patient. When the temperature probe 20 is inserted into the rectum during a rectal temperature measurement procedure, the light will begin to visibly diminish in intensity when the tip 26 of the probe 20 has been inserted the proper distance. If the light is no longer visible to the user, the user will recognize that the temperature probe 20 should be inserted no further. Thus, this visible indicia provides a safety measure that guards against over-insertion into the rectum and therefore avoids potential damage to the rectal tissue.

In the exemplary embodiment depicted in FIG. 3, a plurality of circular holes 85 are drilled or otherwise formed in the wall of the tubular member 22 at circumferentially spaced intervals about the circumference of the tubular member 22, such as for example four holes spaced at 90° intervals. In the exemplary embodiment depicted in FIG. 4, a plurality of circumferentially extending slots 85 are cut or otherwise formed in the wall of the tubular member 22 about the circumference of the tubular member 22 such that the light emitted through from the lamp 80 disposed within the interior of the probe 20 in effect forms a "band" of light. As the probe 20 will always be covered by a probe cover 40 when in use, the light passages 85 may be left open. However, if desired, the light passages 85 may be filled with a translucent plastic material, a transparent plastic material or other light transmissive material. In the depicted embodiments, the light passages 85 are located slightly rearward, that is in the direction of the handle 26, of the connection of the tip 26 to the distal end 25 of the tubular member 22. However, if necessary to properly locate the light passages to indicate a desired insertion depth, the light passages 85 may be formed in the wall of the tip 26 of the probe 20 forward of the connection of the tip 26 to the distal end of the tubular member 22.

If desired, an additional light passage may be disposed at the end of the tip portion of the probe 20 through which light from the light emitting device illuminates a region exterior of and forward of the tip 26 of the tubular member. For example, as depicted in FIG. 4, light passage 87 is provided through the probe wall at the apex of the tip 26 of the probe 20 so as to direct light, L, generated by the light emitting device 80 from the hollow interior of the probe 20 axially outward to illuminate the region in front of the probe to improve visibility for the user when inserting the probe tip rectally, or positioning the probe tip into a sublingual pocket at the rear of the mouth, or positioning the probe tip properly within the arm pit.

Referring now to FIG. 5, there is depicted another exemplary embodiment of the probe 20 wherein light emitting devices 90 are provided to illuminate the tip portion of the probe 20. In this embodiment, the light emitting devices 90 are mounted in the forward end 27 of the handle 28 of the probe 20. Light emitted from the light emitting devices 90 passes through longitudinally directed holes 92 formed through the end face of the forward end 27 of the handle 28. The holes 92 are arranged in the end face such that light passing therethrough is directed into the annular wall of the probe cover 40 to travel down the length of the probe cover 40 to illuminate the tip portion 46 of the probe cover. In this embodiment, the probe cover 40 functions as a light pipe in that the annular wall of the probe cover transits the light entering the wall at the proximal end of the probe cover to the tip portion 46 of the probe cover.

In an embodiment, the tip portion 46 of the probe cover 40 may be made of a transparent plastic material and the shaft 42 of the probe cover made of a translucent plastic material, whereby light transmitted longitudinally along the length of the wall of the shaft 42 of the probe cover will pass out of the transparent tip 46 of the probe cover 40 so as to illuminate not only the region exteriorly and forwardly of the probe 20, but also illuminate the region exteriorly and circumferentially about the entire tip portion 46 of the probe cover 40 rearward of the very forward end of the probe 20. In this embodiment, as the tip portion of the probe/probe cover assembly is fully illuminated, the user can avoid over-insertion of the probe in a rectal temperature mode by stopping the insertion as soon as the illuminated tip of the probe disappears into the rectum. Additionally, the illuminated tip will provide sufficient light about the exterior of the probe tip to properly position the probe tip within a sublingual pocket at the rear of the patient's mouth in oral application or in the patient's arm pit in axillary application. Alternatively, the tip portion 46 of the probe cover may be of a translucent plastic material and the shaft 42 of the probe cover 40 made of a transparent material.

Figure 6:
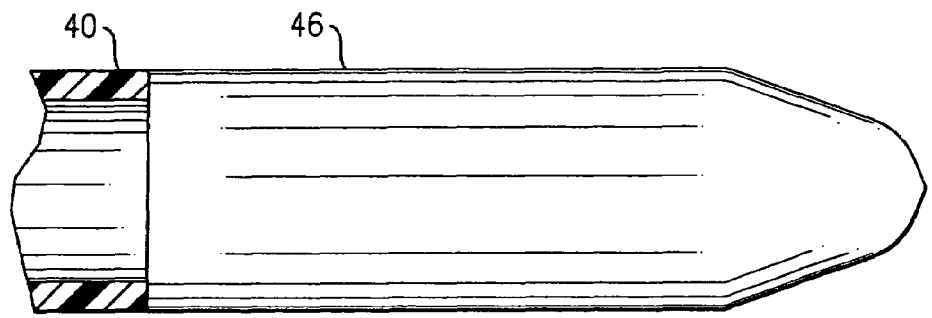
FIG. 6 is a side elevation view, partly sectioned, of an exemplary embodiment of a probe cover in accordance with another aspect of the invention.
Figure 7:
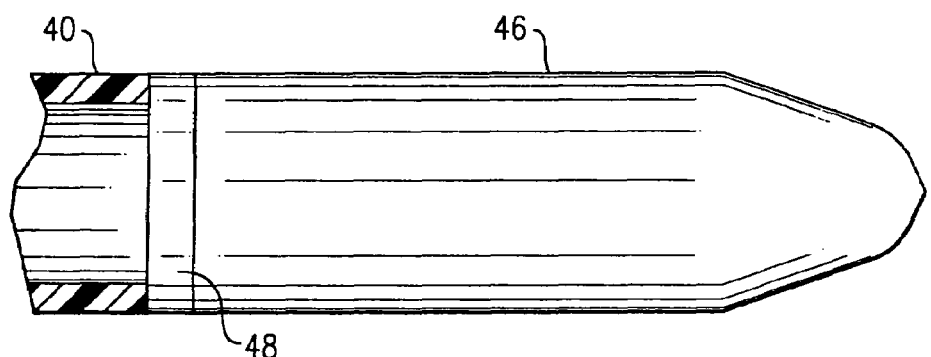
FIG. 7 is a side elevation view, partly sectioned, of another exemplary embodiment of a probe cover in accordance with another aspect of the invention.

In the exemplary embodiment depicted in FIG. 6, the tip portion 46 of the probe cover 40 may be provided with a textured exterior or may be colored differently than the reminder of the probe cover that when illuminated by light passing down the wall of the probe cover 40, which functions as a light pipe, will be readily distinguishable by the user as the tip 26 of the probe 20, thereby facilitating proper and safe placement of the probe tip into the patient's rectum or mouth. In the exemplary embodiment depicted in FIG. 7, a band of luminescent material 48 may be provided on the probe cover 40 at a selected distance inwardly from the distal end of the tip portion 46 commensurate with the desired depth of insertion of the probe into the rectum of a patient during a rectal temperature measurement procedure. In this embodiment, the band 48 will luminance when illuminated by light passing down the wall of the probe cover 40, which again functions as a light pipe, thereby providing a visible indicia of the proper insertion depth. In the embodiments depicted in FIGS. 6 and 7, either or both of the tip portion 46 and the shaft 42 of the probe cover 40 may be made of a transparent or a translucent material.

In a further embodiment, the light emitting device 90 may emit a particular color spectrum of light, such as red light or green light, rather than white light. Red light or green light will illuminate any trace moisture that may be present on the exterior surface of the probe cover 40, which would not be illuminated by conventional white light. Trace moisture on the exterior of the probe cover 40 would be an indication that the probe cover 40 is contaminated and no longer sterile. If moisture is detected, the user can abort the process before insertion of the probe, eject and replace the contaminated cover with a new sterile cover and reinitiate the process. The use of a red or green light, or other suitable color of light, emitting device provides a safeguard against the inadvertent use of a contaminated probe and resultant cross-contamination between patients.

In some healthcare facilities, the task of taking a patient's temperature is often handled by lower skilled individuals, rather than by skilled healthcare professionals. Thus, the user of the thermometry apparatus may not fully appreciate the significance of the measured patient temperature displayed on the screen 18 of the apparatus 10. Accordingly, the thermometry apparatus of the invention may also include an alert to the user whenever the temperature measured by the probe exceeds a preselected threshold limit. In an embodiment, the threshold limit is preset at a temperature value that would indicate that the patient has a fever. For example, if the rectal temperature measurement mode is selected, the threshold limit would be set at 101° F., while if the oral temperature measurement mode is selected, the set point limit would be set at 100° F. In an embodiment, the threshold limit is preset at a temperature value that would indicate that the patient has a fever high enough to warrant notification to the attending physician. For example, a threshold limit of 104° F. might be selected for the rectal temperature measurement mode, while a threshold limit of 103° F. might be selected for the oral temperature measurement mode.

Referring now to FIG. 8, in operation, the processor 100 receives a temperature signal from the temperature sensor 24 within the tip of the probe 20, converts the received signal into a measured patient temperature, and displays the measured patient temperature on the display screen 18 in a conventional manner. The central processing unit of the processor 100 includes comparator circuitry for comparing the measured patient temperature to a temperature threshold limit that has been preprogrammed into the central processing unit of the processor 100. If the measured patient temperature exceeds that threshold limit, the control unit of the processor 100 activates an alert perceptible to the user, for example either visually or audibly.

In an embodiment of the thermometry apparatus of the invention, the processor 100 flashes the probe illumination lamps 80 or 90 to provide an alert perceptible to the user that the measured patient temperature exceeds the preprogrammed threshold limit, thereby alerting the user that the patient has a fever or an excessive fever. In another embodiment of the thermometry apparatus, the processor 100 changes the color of the light emitted from the probe illumination lamps 80 or 90 to provide an alert perceptible to the user that the measured patient temperature exceeds the preprogrammed threshold limit, thereby alerting the user that the patient has a fever or an excessive fever. In an embodiment of the thermometry apparatus, a warning lamp 105 is provided in the handle 28 of the probe 20 and the processor 100 selectively activates the warning lamp 105 to provide an alert perceptible to the user that the measured patient temperature exceeds the preprogrammed threshold limit, thereby alerting the user that the patient has a fever or an excessive fever.

In another embodiment of the thermometry apparatus, the processor 100 flashes the temperature displayed on the display screen 18 to provide an alert perceptible to the user that the measured patient temperature exceeds the preprogrammed threshold limit, thereby alerting the user that the patient has a fever or an excessive fever. In another embodiment of the thermometry apparatus, the processor 100 presents a warning icon 103, either static or flashing, on the display screen 18 to provide an alert perceptible to the user that the measured patient temperature exceeds the preprogrammed threshold limit, thereby alerting the user that the patient has a fever or an excessive fever.

The invention has been described herein with reference to a portable electronic thermometry apparatus of the type wherein the probe 20 is tethered to a base housing 12 wherein a temperature calculating processor and a display are disposed. However, it is to be understood that the invention is also applicable to electronic thermometers of the type wherein a temperature calculating unit and an associated display are incorporated into the handle of the probe itself, such as for example disclosed in U.S. Pat. Nos. 6,886,979 or 6,957,911.

Accordingly, while the present invention has been particularly shown and described with reference to the exemplary embodiments as illustrated in the drawing, it will be understood by one skilled in the art that various changes in detail may be effected therein without departing from the spirit and scope of the invention as defined by the claims.

We claim:

1. A probe for use in sensing a body temperature of a vertebrate, comprising:
   a handle having a forward end;
   a longitudinally elongated tubular member having a wall defining a hollow interior, a proximal end connected to said handle, and a distal end having a tip portion having a closed end;
   a temperature sensing element mounted in the tip portion of said tubular member for producing a signal indicative of the temperature of the tip portion of said tubular member;
   a light emitting device operatively associated with said tubular member for illuminating the hollow interior of said tubular member; and
   a light passage through the wall of said tubular member for providing a path for light from said light emitting device to pass exteriorly of said tubular member.

2. A probe as recited in claim 1 wherein said light passage is positioned at a selected distance from the end of the tip portion of said tubular member.

3. A probe as recited in claim 2 wherein said light passage comprises an indicia of an insertion depth limit on the distal end of said tubular member.

4. A probe as recited in claim 3 wherein said light passage comprises at least one opening through the wall of said tubular member.

5. A probe as recited in claim 4 wherein said light passage comprises a plurality of holes through the wall of said tubular member, the holes disposed at circumferentially spaced intervals about the wall of said tubular member.

6. A probe as recited in claim 4 said light passage comprises a plurality of circumferentially extending slots through the wall of said tubular member disposed so as to form a band about the wall of said tubular member.

7. A probe as recited in claim 4 wherein said at least one opening through the wall of said tubular member is sealed with translucent material.

8. A probe as recited in claim 3 further comprising an additional light passage disposed at the end of the portion of said tubular through which light from light emitting device illuminates an area exterior of and forward of the tip portion of said tubular member.

9. A probe as recited in claim 1 wherein the tip portion of said tubular member is formed of a light transmissive material whereby the tip portion of said tubular member comprises said light passage.

10. A probe as recited in claim 1 further comprising a temperature calculating unit operatively associated with said temperature sensing element for estimating a the temperature of the patient based on the signal indicative of the temperature of the tip portion of said tubular member produced by said temperature sensing element.

11. A probe as recited in claim 10, further comprising a display operatively associated with said temperature calculating unit for displaying the temperature of the patient.

12. A probe as recited in claim 1 further comprising a power supply operatively associated with said light emitting device for providing power to said light emitting device.

13. A temperature sensing probe for use in connection with a thermometry apparatus including a temperature calculating unit for estimating a body temperature of a patient and a display for presenting the temperature of the patient, the temperature calculating unit and the display disposed in a housing of the thermometry apparatus, the temperature sensing probe comprising:
   a handle having a forward end;
   a longitudinally elongated tubular member having a wall defining a hollow interior, a proximal end connected to said handle, and a distal end having a tip portion having a closed end;
   a temperature sensing element mounted in the tip portion of said tubular member for producing a signal indicative of the temperature of the tip portion and transmitting said signal indicative of the temperature of the tip portion to said temperature calculating unit;
   a light emitting device operatively associated with said tubular member for illuminating the hollow interior of said tubular member; and
   a light passage through the wall of said tubular member for providing a path for light from said light emitting device to pass exteriorly of said tubular member.

14. A probe as recited in claim 13, wherein said light passage is positioned at a selected distance from the end of the tip portion of said tubular member.

15. A probe as recited in claim 14, wherein said light passage comprises an indicia of an insertion depth limit on the distal end of said tubular member.

16. A probe as recited in claim 15, wherein said light passage comprises at least one opening through the wall of said tubular member.

17. A probe as recited in claim 16, wherein said light passage comprises a plurality of holes through the wall of said tubular member, the holes disposed at circumferentially spaced intervals about the wall of said tubular member.

18. A probe as recited in claim 16, wherein said light passage comprises a plurality of circumferentially extending slots through the wall of said tubular member disposed so as to form a band about the wall of said tubular member.

19. A probe as recited in claim 16, wherein said at least one opening through the wall of said tubular member is sealed with translucent material.

20. A probe as recited in claim 16 wherein said at least one opening through the wall of said tubular member is sealed with transparent material.

21. A probe as recited in claim 15, further comprising an additional light passage disposed at the end of the portion of said tubular through which light from light emitting device illuminates an area exterior of and forward of the tip portion of said tubular member.

22. A probe as recited in claim 13, wherein the tip portion of said tubular member is formed of a light transmissive material whereby the tip portion of said tubular member comprises said light passage.

23. A thermometry apparatus for use in determining a body temperature of a patient, comprising:
a temperature sensing probe including a longitudinally elongated tubular member having a wall defining a hollow interior, said probe having a distal tip portion having a closed end;
a temperature sensing element mounted within the tip portion of said probe for producing a signal indicative of the temperature of the tip portion of said probe;
a processor for receiving the signal indicative of the temperature of the tip portion of said probe produced by said temperature sensing element and estimating a the temperature of the patient based on the signal indicative of the temperature of the tip portion of said probe;
a display operatively associated with said processor for displaying the temperature of the patient;
a light emitting device operatively associated with said tubular member of said probe for illuminating the hollow interior thereof; and
a light passage through the wall of said tubular member of said probe for providing a path for light from said light emitting device to pass exteriorly of said probe.

24. A thermometry apparatus as recited in claim 23, wherein said light passage is positioned at a selected distance from the end of the tip portion of said probe.

25. A thermometry apparatus as recited in claim 24, wherein said light passage comprises an indicia of an insertion depth limit on the distal end of said probe.

26. A thermometry apparatus as recited in claim 25, wherein said light passage comprises at least one opening through the wall of said tubular member.

27. A thermometry apparatus as recited in claim 26, wherein said light passage comprises a plurality of holes through the wall of said tubular member, the holes disposed at circumferentially spaced intervals about the wall of said tubular member.

28. A thermometry apparatus as recited in claim 26, said light passage comprises a plurality of circumferentially extending slots through the wall of said tubular member disposed so as to form a band about the wall of said tubular member.

29. A thermometry apparatus as recited in claim 26, wherein said at least one opening through the wall of said tubular member is sealed with translucent material.

30. A thermometry apparatus as recited in claim 26, wherein said at least one opening through the wall of said tubular member is sealed with transparent material.

31. A thermometry apparatus as recited in claim 25, further comprising an additional light passage disposed at the end of the portion of said tubular through which light from light emitting device illuminates an area exterior of and forward of the tip portion of said tubular member.

32. A thermometry apparatus as recited in claim 23, wherein the tip portion of said tubular member is formed of a light transmissive material whereby the tip portion of said tubular member comprises said light passage.

33. A method for using a rectal probe for use in sensing a body temperature of a vertebrate via insertion into the vertebrate's rectum, said method comprising the steps of:
inserting a tip portion of said probe into the rectum of a patient, said probe including:
a handle having a forward end;
a longitudinally elongated tubular member having a wall defining a hollow interior, a proximal end connected to said handle, and a distal end having a tip portion having a closed end;
a temperature sensing element mounted in the tip portion of said tubular member for producing a signal indicative of the temperature of the patient;
a lighted indicia provided in the wall of said tubular member, said lighted indicia adapted to be illuminated from interiorly of said tubular member; and
a light emitting device disposed in operative association with said lighted indicia for illuminating said lighted indicia from interiorly of said tubular member wherein said lighted indicia is disposed at a selected distance longitudinally inwardly of the end of the tip portion of the tubular member; and
inserting the tip portion of said probe to a desired depth commensurate with said lighted indicia.

34. A probe for use in sensing a body temperature of a vertebrate, comprising:
a handle having a forward end;
a longitudinally elongated member having a proximal end connected to said handle, a closed end forming a tip portion of said probe, and an exterior surface;
a temperature sensing element mounted in the tip portion of said tubular member for producing a signal indicative of the temperature of the tip portion of said probe;
a light emitting device mounted in said handle; and
a disposable probe cover overlaying the longitudinally elongated member having a tubular wall overlaying the exterior surface of the longitudinally elongated member of said probe, said probe cover having a light conductive wall operative as a light pipe for conducting light emitted from said light emitting device along the longitudinally elongated member from its proximal end to the distal tip portion of said probe.

35. A probe as recited in claim 34, wherein said disposable probe cover has a transparent distal end.

36. A probe as recited in claim 34, wherein said disposable probe cover has a textured distal end.

37. A probe as recited in claim 34, wherein said light emitting device emits a colored light effective to illuminate trace moisture collecting on an exterior surface of said probe cover.

38. A probe as recited in claim 37, wherein said light emitting device emits red light or green light.

39. A disposable probe cover for an elongated probe of a thermometry apparatus, said disposable probe cover comprising an axially elongated sleeve member having an open proximal end and a distal tip having a closed end, the distal tip having means for identifying a desired depth of insertion of said elongated probe said means including a band of luminescent material provided on the sleeve member at a selected distance inwardly from the closed end of the distal tip commensurate with the desired depth of insertion of said elongated probe.

40. A disposable probe cover as recited in claim 39, wherein said sleeve member being light transmissive axially.

41. A disposable probe cover as recited in claim 39, wherein the distal tip of said sleeve member is light transparent.

42. A disposable probe cover as recited in claim 39, wherein the distal tip of said sleeve member is light translucent.

43. A disposable probe cover as recited in claim 39, wherein the distal tip of said sleeve member has a color distinctive from the sleeve member.

44. A disposable probe cover as recited in claim 39, wherein the distal tip of said sleeve member is textured.

* * * * *